United States Patent [19]

Adams

[11] 4,305,306

[45] Dec. 15, 1981

[54] DRIVE ASSEMBLY

[75] Inventor: Frederick J. Adams, Clevedon, England

[73] Assignee: Cam Gears Limited, Hertfordshire, England

[21] Appl. No.: 84,134

[22] Filed: Oct. 12, 1979

[30] Foreign Application Priority Data

Oct. 17, 1978 [GB] United Kingdom ............ 40798/78

[51] Int. Cl.³ ............................................. F16H 15/08
[52] U.S. Cl. ...................................... 74/194; 74/208; 417/24; 417/223
[58] Field of Search ...................... 74/190, 190.5, 194, 74/196, 200, 207, 208, 209, 214, 691; 417/223, 429, 24; 474/15, 19, 46, 11, 13, 28

[56] References Cited

U.S. PATENT DOCUMENTS

| | | | |
|---|---|---|---|
| 2,982,147 | 5/1961 | Painhard | 74/190.5 X |
| 3,372,600 | 3/1968 | Opocensky | 74/194 |
| 3,654,812 | 4/1972 | Rouverol | 74/200 |
| 3,745,844 | 7/1973 | Schottler | 74/208 X |
| 3,875,814 | 4/1975 | Stever | 74/197 X |
| 3,935,707 | 2/1976 | Murphy et al. | 417/24 X |
| 3,973,540 | 8/1976 | List | 417/223 |
| 4,170,438 | 10/1979 | Kondo et al. | 74/200 X |
| 4,173,152 | 11/1979 | Kondo et al. | 74/190 |

FOREIGN PATENT DOCUMENTS 1279281 11/1961 France.

Primary Examiner—C. J. Husar
Assistant Examiner—Moshe I. Cohen
Attorney, Agent, or Firm—Yount & Tarolli

[57] ABSTRACT

A rotatable input shaft (1) drives a rotatable output shaft (18) through a roller (7) which roller is displaceable along its rotational axis (8) while maintaining driving engagement with drive faces (6 and 14) of the shafts (1 and 18) respectively to vary the drive ratio through the assembly. The roller (7) is controlled in its displacement by a piston and cylinder device (10, 11) to which fluid pressure is directed under control of a spool valve (22). The spool (26) of valve (22) is displaceable to determine fluid flow towards and from the piston chambers (12 and 13) of the piston and cylinder device under control of the speed of rotation of the output shaft (18) through a centrifugal governor (34) and a push rod (33) reacting between the spool (26) and the governor (34). If the rotational speed of shaft (18) varies substantially from a predetermined value (for example by variations in rotational speed of the input shaft (1)) the governor (34) reacts to displace the spool (26) in a manner which directs fluid pressure to piston chambers (12 and 13) and displaces the roller (7) in a sense to increase or decrease the mechanical advantage at which drive is transmitted between the input and output shafts to adjust the rotational speed of the output shaft (18) and maintain it substantially constant.

15 Claims, 4 Drawing Figures

DRIVE ASSEMBLY

DESCRIPTION

This invention relates to a drive assembly.

According to the present invention there is provided a drive assembly comprising an input member rotatable about a first axis; an output member rotatable about a second axis; a transmission member co-operating with said input and output members and being rotatable about a third axis which extends laterally with respect to the longitudinal extent of the first and second axes and is arranged so that the output member is rotatably driven in response to rotation of the input member and through the transmission member, said transmission member being displaceable along the third axis to change the ratio at which drive is transmitted from the input member through the transmission member to the output member; fluid pressure operated means which controls said displacement of the transmission member and wherein said input, output and transmission members are rotatably mounted in a housing containing a traction fluid for drive to be transmitted from the input member to the output member by fluid film traction.

More particularly, the invention concerns a drive assembly in which an output member is to be rotatably driven from a rotatably driven input member and in which a control system is provided for maintaining the speed of rotation or angular velocity of the output member substantially constant if the speed of rotation or angular velocity of the input member attains or exceeds a predetermined minimum speed or angular velocity. Accordingly therefore it is preferred that the fluid pressure operated means is responsive to fluid pressure directed thereto under control of the speed of rotation of the output member so that when the speed attains a predetermined value said fluid pressure is adjusted in response to variations from that value to maintain the predetermined speed of rotation of the output member substantially constant.

The input, output and transmission members constitute a friction or traction drive assembly. In such an assembly it is preferred that the first and second axes are in substantially parallel and spaced planes (usually with such axes extending parallel to each other) and the input and output members respectively have drive faces which extend laterally to the longitudinal extent of their respective axes and with both of which drive faces the transmission member co-operates to be rotated about its third axis in transmitting drive from the input member to the output member. The housing within which the input, output and transmission members are rotatably mounted contains the traction fluid which provides a fluid film drive between those members; an appropriate traction fluid for oil film drive is a cycloaliphatic synthetic hydrocarbon fluid, for example such as that made by Monsanto Limited and sold under the Trade Name "Santotrac".

The fluid pressure operated means by which the transmission member is controlled for displacement along its rotational axis will usually be in the form of a piston and cylinder device which responds to fluid pressure to vary the position at which the transmission member co-operates with the input and output members or more usually to vary the respective radii at which the transmission member co-operates with the input and output members from the rotational axes of those members. By appropriate adjustment of the fluid pressure operated means the position of the transmission member can be displaced with respect to the first and second axes so that when the rotational speed of the output member attains a predetermined speed at which it is desired to be maintained substantially constant, any variation in the rotational speed of the input member (above a predetermined minimum speed of that member which minimum speed is consistent with the desired constant speed of the output member) which would otherwise effect a substantial change in the rotational speed of the output member from its desired constant speed is compensated for by appropriate adjustment of the transmission member.

The aforementioned piston and cylinder device can be single or doube acting and can be biased to a condition in which drive will be transmitted through the assembly at a maximum or a minimum mechanical advantage; preferably such biasing urges the assembly to a condition in which drive is transmitted with maximum mechanical advantage so that during initial rotation of the input member, for example during start-up of a motor vehicle to which the assembly may be fitted for driving auxilliary components (such as a water pump or dynamo) of the vehicle, the load on the input member and therefore the load to which the vehicle engine will be initially subjected from the auxilliary components may be alleviated.

Fluid pressure can be directed to the fluid pressure operated means by valve means having a component, such as a spool of a spool valve, which is adjustable to vary such fluid pressure as appropriate in response to variations in speed of rotation of the output member. The valve means is preferably adjustable in response to displacement of a centrifugally actuated governor which governor is responsive to the speed of rotation of the output member. With a piston and cylinder type fluid pressure operated means the valve means will direct fluid under pressure or exhaust the appropriate piston chamber or chambers of such device and in the case of a single acting piston and cylinder device it is preferred that the valve means is biased to a condition in which the piston chamber which is intended to be pressurised communicates through the valve means with exhaust (a fluid reservoir) when the output member is non-rotating. With a double acting piston and cylinder device it is preferred that the valve means is biased to a condition in which, when the output member is non-rotating, the transmission member is urged (by fluid pressure in one piston chamber and the other piston chamber being exhausted) to a position in which drive can be transmitted through the assembly from the input member to the output member with predetermined maximum or minimum mechanical advantage.

Alternatively, fluid pressure can be directed to the fluid pressure operated means by a pump the fluid pressure output from which is controlled by the speed of rotation of the output member; preferably, and conveniently, the pump can be coupled to be driven by the output member so that its output is in proportion to the speed of rotation of the output member. In this alternative construction the fluid pressure operated means will usually be a single acting piston and cylinder device the pressurised piston chamber of which is biased to a minimum volume condition and is in constant communication with the outlet from the pump so that as the pump pressure increases in accordance with the speed of rotation of the output member, the piston chamber expands against its biasing to displace the transmission member as appropriate.

Embodiments of drive assemblies constructed in accordance with the present invention will now be described, by way of example only, with reference to the accompanying illustrative drawings, in which.

Figure 3:
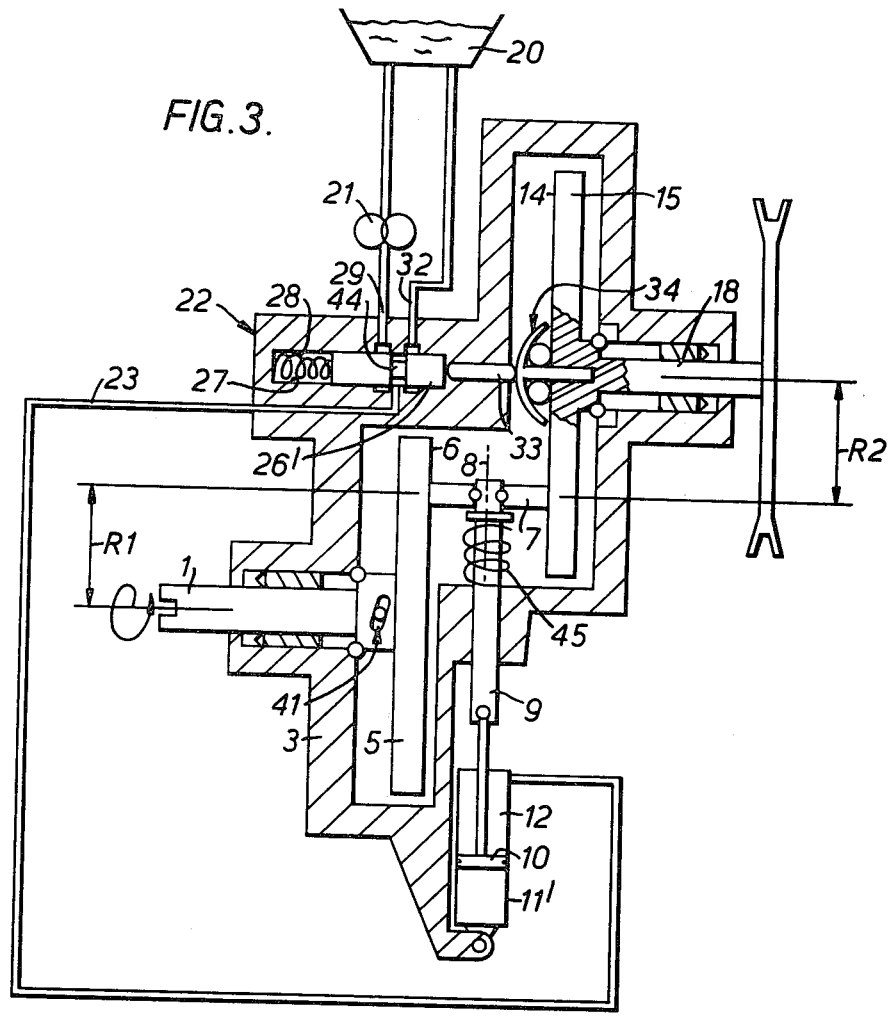
Figure 4:
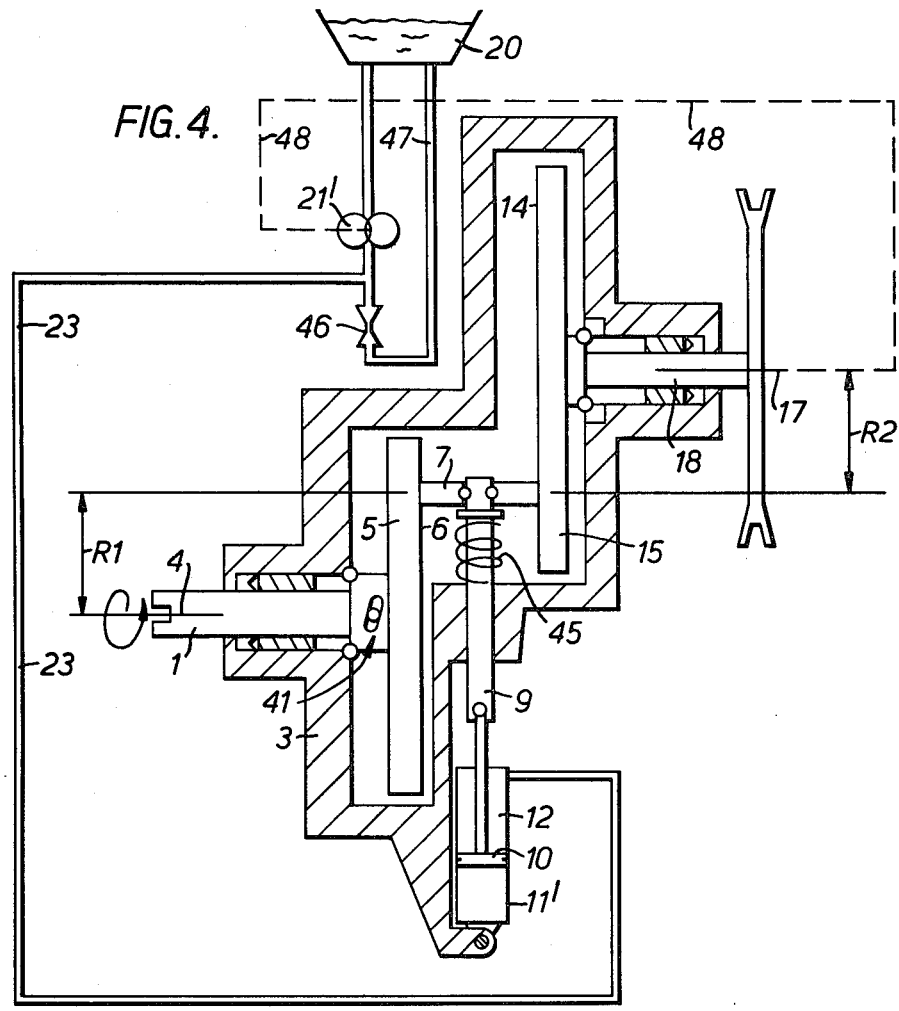

FIG. 3 shows a section through a second embodiment of the assembly in which the fluid pressure operated means comprises a single acting piston and cylinder device, the flow of fluid under pressure to which is regulated by a spool valve, and FIG. 4 shows a section through a third embodiment of the assembly in which the fluid pressure operated means comprises a single acting piston and cylinder device, the flow of fluid under pressure to which is from a pump the output from which varies in accordance with variations in speed of the output member of the assembly.

Where possible throughout the following description the same parts or members in each of the Figures have been accorded the same references.

Figure 1:
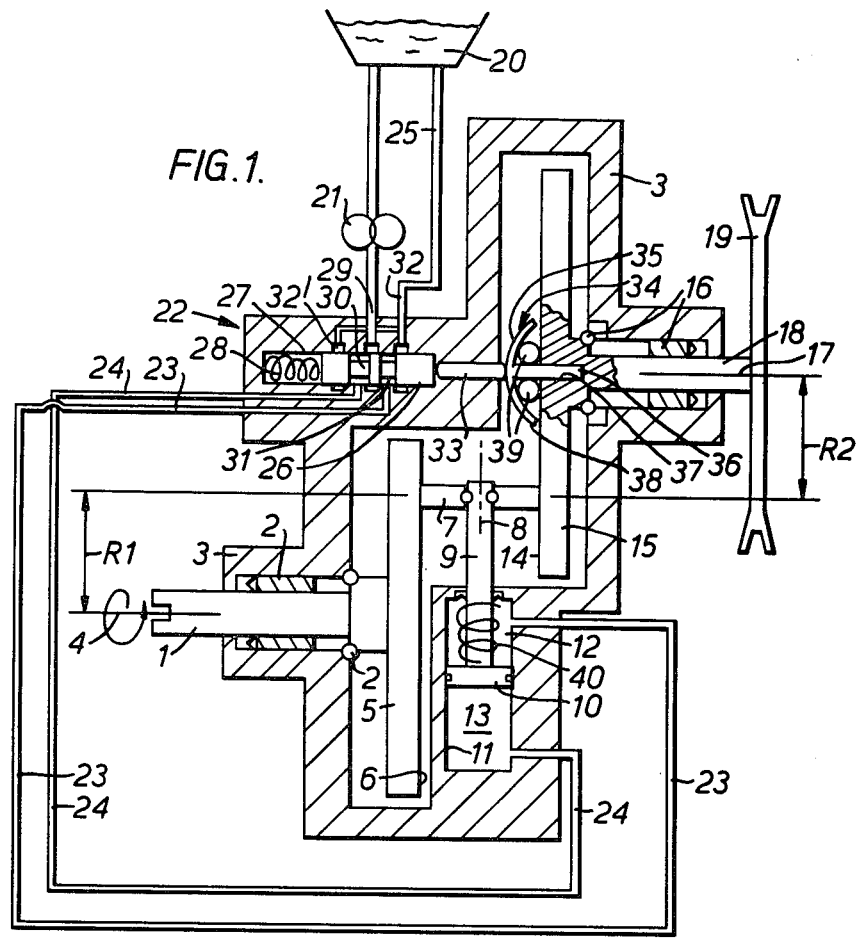
FIG. 1 is a section through a first embodiment of the assembly in which the fluid pressure operated means comprises a double acting piston and cylinder device the flow of fluid pressure to which is controlled by a regulated spool valve.

Referring firstly to the embodiment shown in FIG. 1, the assembly has an input shaft 1 which is mounted in plain and roller bearings 2 in a housing 3 for rotation about an axis 4. Secured to the shaft 1 at the inner end thereof within the housing 3 is a disc 5 having a drive face 6 which is located in a plane extending perpendicular to the axis 4. Co-operating with the drive face 6 is a roller 7 which is mounted for rotation about an axis 8 that extends substantially perpendicular to the axis 4. The roller 7 is rotatably mounted on a piston rod 9 extending from a piston 10 which is displaceable in a cylinder 11 to displace the roller 7 along its rotational axis 8. The cylinder 11 is formed within the wall of the housing 3 and defines with the piston 10 opposed piston chambers 12 and 13.

Co-operating with the roller 7 on the side thereof diametrically opposite the position of engagement between the roller and the drive face 6 is a drive face 14 of a disc 15 which is mounted within the housing 3 in bearings 16 for rotation about an axis 17. The axis 17 is substantially parallel with the axis 4 and is radially spaced relative thereto while the drive face 14 is located in a plane which extends perpendicularly to the axis 17. Integrally formed with the disc 15 is an output shaft 18 which extends from the housing 3 and carries at the outer end thereof a "V" pulley wheel 19.

The circumferential edge of the roller 7 is in frictional or tractional and driving engagement with both the drive faces 6 and 14 so that when the input shaft 1 is rotatably driven such drive is transmitted from the drive face 6, through the roller 7 (which is caused to rotate about its axis 8), to the drive face 14 and thereby a rotational output is provided at the shaft 18 and pulley wheel 19. The housing 3 is filled, or substantially so, with a traction drive fluid such as the material sold under the Trade Mark "Santotrac" as aforementioned.

The ratio at which drive is transmitted from the input shaft 1 to the output shaft 18 is dependent upon the ratio between the radius R1 at which the roller 7 co-operates with the drive face 6 from the axis 4 and the radius R2 at which the roller 7 co-operates with the drive face 14 from the axis 17. From the arrangement shown and the relative disposition of the axes 4 and 17 it will be realised that as the roller 7 is displaced upwardly in the Figure, R1 progressively increases while R2 decreases; consequently when R1 and R2 are at minimum and maximum radii respectively the ratio which is transmitted through the assembly is at a maximum mechanical advantage whereby for a given speed of rotation of the shaft 1, the shaft 18 is rotated at a minimum speed. As the radii R1 and R2 progressively increase and decrease respectively so the mechanical advantage which is transmitted from the input shaft 1 to the output shaft 18 progressively decreases and when the radius R1 is at a maximum the speed of rotation of the shaft 18 will be at its maximum for a given speed of rotation of the shaft 1 (while the mechanical advantage of the transmission is at a minimum).

The ratio of the transmission through the assembly is determined by the radial positioning of the roller 7 which is controlled by the fluid pressure operated piston and cylinder device 10, 11 whereby when either one of the piston chambers 12, 13 is subjected to fluid pressure while the other chamber is exhausted the piston 10 together with its rod 9 and the roller 7 carried thereby will be displaced along the axis 8. For achieving such displacement of the piston 10 there is provided a hydraulic system comprising a reservoir 20 which feeds a pump 21 (which may be driven at constant speed). The output from the pump 21 is controlled by a spool valve 22 to be directed to either one or the other of passages 23 and 24 which are in constant communication with piston chambers 12 and 13 respectively. The spool valve 22 is effectively a change-over valve whereby when one of the passages 23 or 24 communicates with the pump 21, the other passage 24 or 23 respectively is opened through the valve means 22 to communication with a passage 25 providing a return to the reservoir 20.

The valve 22 comprises a spool 26 which is axially slidable in a direction parallel to the axis 17 (and conveniently concentric therewith) in a spool cylinder 27 formed in the wall of the housing 3. The spool 26 is biased by a spring 28 in its cylinder to an end condition in which an inlet port 29 of the valve (communicating with the output from the pump 21) communicates by way of a recess 30 in the spool with the passage 24 while the passage 23 communicates by way of a second annular recess 31 in the spool with an outlet port 32 of the valve which communicates by way of the passage 25 with the reservoir so that in the position shown, when the pump 21 is operative, the piston chamber 13 is subjected to fluid pressure from the pump 21 while the piston chamber 12 communicates with the reservoir 20. Upon axial displacement of the spool 26 leftwardly in the drawing against its biasing spring and from the end condition the inlet port 29 is closed to communication with the spool recess 30 while that recess is opened to communication with a port 32' (which extends from the outlet port 32) while the spool recess 30 maintains communication with the passage 24; in addition the spool recess 31 moves out of communication with the outlet port 32 and into communication with the inlet port 29 while that spool recess maintains communication with the passage 23. By this latter adjustment of the valve it will be realised that the piston chamber 12 will be subjected to fluid under pressure from the pump 21 while the piston chamber 13 communicates with the reservoir 20 so causing the piston 10 and the roller 7 to be displaced downwardly in the drawing.

Displacement of the spool 26 against its biasing spring 28 is achieved by a push rod 33 which is slidably mounted in the wall of the housing 3 and extends along the axis 17. Axial displacement of the push rod 33 is controlled by a centrifugal governor 34 and for such displacement the push rod abuts at one end against the spool 26 while its other end abuts a "mushroom" casing 35 of the governor 34. The casing 35 has a stub shaft 36 which is received in a recess 37 in the disc 15 concentrically with the axis 17. The stub shaft 36 is slidable relative to the disc 15 along the axis 17 and has a part spherical head 38 between the concave surface of which and the drive face 14 are captured ball members 39. In an inoperative condition of the governor 34 the balls 39 are retained at radially inward positions adjacent the stub shaft 36 by the radially inward force exerted thereon from the biasing spring 28, through the spool 26, the push rod 33 and the relatively inclined surfaces of the head 38; however, at a predetermined speed of rotation of the disc 15 the balls 39 rotating therewith are subjected to sufficient centrifugal force which causes them to be displaced radially outwardly of the stub shaft 36 between the part spherical surface of the head 38 and the drive face 14 which has the effect of displacing the "mushroom" casing leftwardly in the drawing together with the push rod 33 and the spool 26 against the biasing of spring 28.

In operation of the assembly as above described, it first is assumed that the input shaft 1 is driven at slow speed and the pump 21 is operative, if the speed rotation of the disc 15 is insufficient to displace the balls 39 radially outwardly of the stub shaft 36 then the assembly will be as shown in FIG. 1 whereby fluid under pressure from the pump 21 is directed to the piston chamber 13 while the piston chamber 12 is open to communication with the reservoir 20. This has the effect of displacing the piston 10 and roller 7 upwardy in FIG. 1 to increase the radius R1 and decrease the radius R2 to provide a decrease in the mechanical advantage of the drive which is transmitted (that is to say the assembly moves progressively to a higher gear ratio between rotation of the output shaft 18 and rotation of the input shaft 1).

If, during the aforementioned displacement of the roller 7 upwardly in FIG. 1 to increase the radius R1 and/or as a result of an increase in the rotational speed of the input shaft 1, the output shaft 18 is rotated at a predetermined speed which develops sufficient centrifugal force on the balls 39 to displace them radially outwardly of the axis 18, then the spool 26 will be displaced leftwardly against its biasing spring by the centrifugal governor acting on the push rod 33 and such displacement of the spool 26 can cause, as previously described, the piston chamber 12 to be opened to communication with fluid pressure from the pump 21 while the piston chamber 13 is opened to communication with the reservoir 20 (by way of the spool valve 22). As a consequence the piston 10 and thereby the roller 7 will be displaced downwardly in the drawing to decrease and increase the radii R1 and R2 respectively and thereby increase the mechanical advantage of the drive which is transmitted (that is to say to decrease the ratio of the gear through the assembly) so that there is a reduction in the rotational speed of the output shaft 18. Conversely, if the rotational speed of the shaft 18 decreases below the predetermined value, for example as a result of a decrease in the speed at which the shaft 1 is rotated, then the balls 39 will be displaced radially inwardly under the effect of biasing spring 28 to cause an adjustment in the spool valve 22 which directs the hydraulic fluid to displace the roller 7 in a sense which increases and decreases the radii R1 and R2 respectively to decrease the mechanical advantage of the assembly and increase the speed at which the output shaft 18 is rotated. In this way the rotational speed of the output shaft 18 can be maintained substantially constant when the speed at which the input shaft 1 is rotated attains or exceeds a predetermined minimum value. A spring 40 is provided in the piston chamber 12 and this spring biases the piston 10 and thereby the roller 7 downwardly in the drawing with respect to the piston cylinder to normally locate the roller 7 at a minimum radius R1 position with respect to the axis 4. Such spring biasing of the roller 7 to the condition in which the drive which is transmitted through the assembly has maximum mechanical advantage (and the speed at which the output shaft 18 is rotated may be considerably less than that at which the input shaft 1 is rotated) is convenient, particularly if the assembly is incorporated in a motor vehicle, to reduce the load on the power means such as the vehicle engine during initial rotation of the input shaft 1. The facility to provide a rotational speed at the output shaft 18 which will be maintained substantially constant once the input shaft 1 attains or exceeds a predetermined rotational speed may be particularly useful in a motor vehicle as a constant speed drive for an accessory such as a water pump or a dynamo.

Figure 2:
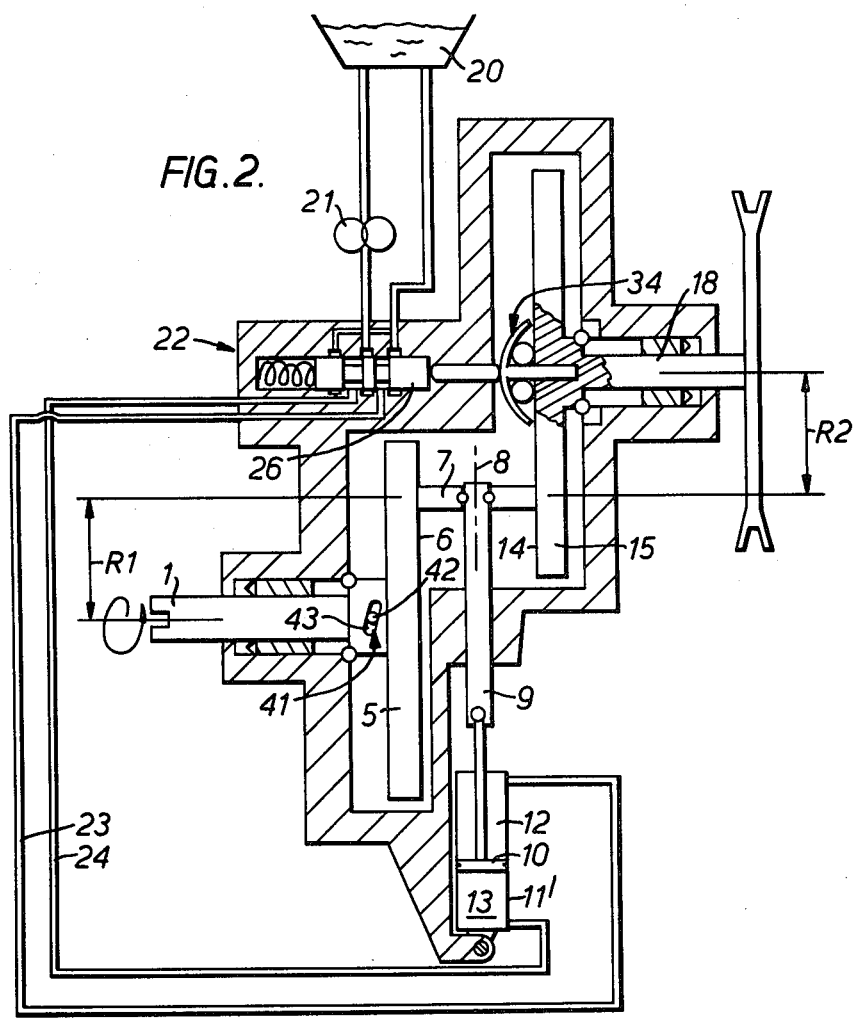
FIG. 2 shows a modification of the assembly in FIG. 1 concerning the installation of the piston and cylinder device.

In the modification of the above described assembly, and as shown in FIG. 2, the piston 10 is reciprocable in a piston cylinder 11' which is mounted externally of the housing 3 and the piston rod 9 on which the roller 7 is rotatably mounted extends in sliding and sealed manner through the wall of the housing. In addition the disc 5 is formed as a separate integer from the input shaft 1 and is coupled thereto through a torque sensitive device 41. The device 41 comprises a pin 42 on the shaft 1 which mates with a slot 43 in a hub of the disc 5 which slot is inclined relative to the axis 4 about which the shaft 1 rotates. The pin and slot coupling 42,43 permits restricted relative rotation about the axis 4 between the shaft 1 and the disc 5 and also restricted axial displacement between that shaft and the disc. More particularly, the torque responsive device is arranged so that when the shaft 1 is rotated in the intended direction the reaction between the pin 42 and the slot 43 causes the pin to be displaced along the slot and thereby the disc 5 to be displaced in the direction of the axis 4 rightwardly in FIG. 2 to urge the drive face 6 into firm driving engagement with the roller 7.

In the embodiment of the assembly shown in FIG. 3 displacement of the roller member 7 along its axis 8 is effected by the piston and cylinder device 10, 11' under control of a spool valve 22 and a centrifugal regulator 34 similar to the embodiment in FIG. 1 but in the assembly of FIG. 3 the hydraulic system is simplified as compared to that in FIG. 1 in so far as the piston and cylinder device is single acting and only the upper piston chamber 12 is intended to communicate alternatively with either fluid pressure from the pump 21 or with the reservoir 20. More particularly, the spool valve 22 has a simple change-over spool 26' having an annulus 44 which is in constant communication with the piston chamber 12 by way of passage 23. In the end condition of the spool 26' to which it is biased in its cylinder 27 by the spring 28 the annulus 44 and thereby the piston chamber 12 communicates with the outlet port 32 and thereby with the hydraulic reservoir. Upon displacement of the spool 26' from its aforementioned end condition the annulus 44 moves out of communication with the outlet port 32 and into communication with the inlet port 29 thereby opening the piston chamber 12 to fluid pressure from the pump 21. Since the piston and cylinder device is single acting the roller 7 is biased by a spring 45 relative to the housing 3 in a sense to contract the piston chamber 12. Therefore, with the piston chamber 12 communicating with the reservoir 20 as shown in FIG. 3 the roller 7 is biased by the spring 45 to its maximum radius R1 at which it co-operates with the drive face 6 and its minimum radius R2 with which it co-operates with the drive face 14; the assembly as drawn therefore is moving towards a condition in which minimum mechanical advantage is provided in the drive which is transmitted between the input and output shafts (or conversely the assembly is at its maximum gear ratio whereby the output shaft 18 will be rotated at its maximum speed for a given speed of rotation of the input shaft 1) and may be regarded as being in a mid condition.

In operation of the assembly in FIG. 3 from the condition drawn, if the speed of rotation of the input shaft 1 is progressively increased it will eventually cause the output shaft 18 to be rotated at a speed at which it is required to be maintained substantially constant. Upon the rotational speed of the output shaft 18 exceeding the required value the centrifugal governor 34 responds to displace the push rod 33 and thereby the spool 26' against its spring loading so opening communication between the piston chamber 12 and fluid pressure from the pump 21. The effect of this is to displace the piston 10 downwardly in FIG. 3 against the biasing of spring 45 so decreasing the radius R1 and increasing the radius R2 and thereby increasing the mechanical advantage of the drive which is transmitted through the assembly (and decreasing the speed at which the shaft 18 is rotated). As the speed of rotation of the shaft 18 reduces to the predetermined value at which it is intended to be maintained the centrifugal governor 34 reacts in a sense which permits the spool 26' to move rightwardly in the Figure until an equilibrium condition is attained. It will therefore be seen that the output shaft 18 can be rotated at a speed which is substantially constant and predetermined when the speed at which the input shaft 1 is rotated attains or exceeds a predetermined minimum value.

In the examples as above described with reference to FIGS. 1 to 3 the rotational speed at which the output shaft 18 will be maintained substantially constant (provided that the input shaft 1 attains or exceeds a predetermined minimum rotational speed) is primarily determined by the inter-action between the centrifugal governor 34 and the spool valve 22 and more particularly by the force which has to be exerted by the governor 34 to overcome the biasing spring 28 in displacing the spool 26 or 26'. With this in mind therefore the assemblies as above described can include a simple modification by which the biasing force exerted by the springs 28 can be adjusted, for example by effectively increasing the axial length of the spool cylinder 27.

The embodiment of the assembly shown in FIG. 4 is similar to that shown in FIG. 3 with the exception of the manner in which the piston chamber 12 of the single acting piston and cylinder device 10, 11' is subjected to fluid pressure for displacing the piston 10 and thereby the roller 7 downwardly against the biasing of spring 45. In FIG. 4 the piston chamber 12 communicates through passage 23 with the outlet of a variable speed pump 21' which is fed from the reservoir 20. The outlet of pump 21' also communicates by way of a restrictor 46 and a passage 47 with the reservoir 20. The pump 21' is coupled through an appropriate line 48 to be driven by the output shaft 18 and at a speed which is proportional to the speed at which the output shaft 18 is rotated. Consequently as the speed of the output shaft 18 is increased so the output from the pump 21' increases with a consequential increase in fluid pressure upstream of the restrictor 46 and thereby in the piston chamber 12 through the passage 23; this has the effect of displacing the roller 7 downwardly in FIG. 4 to progressively decrease the radius R1 and increase the radius R2 from their respective maximum and minimum radii as previously discussed with reference to FIG. 3. By the arrangement in FIG. 4 therefore the rotational speed of the output shaft 18 can be maintained substantially constant through control of fluid pressure to the piston chamber 12 to give appropriate adjustment in the axial positioning of the roller 7 to correct deviations which may occur from the required constant speed of the output shaft.

In the FIG. 4 embodiment the speed at which the output shaft 18 will be rotated and which is to be maintained substantially constant is primarily determined by the hydraulic pressure which is required in the piston chamber 12 to overcome the biasing spring 45; the hydraulic pressure available for the piston chamber 12 is the result of the variable output from the pump 21' and the size of the restrictor 46 and consequently by providing an adjustable restrictor 46 it is possible to adjust and predetermine the speed at which the output shaft 18 is to be maintained substantially constant. Since the pressure which is developed in the piston chamber 12 is partly determined by the resistance afforded by the restrictor 46 to the flow of fluid therethrough the assembly is sensitive to the viscosity of the hydraulic fluid which it uses and since such viscosity may vary in accordance with temperature, the restrictor 46 can, if required, be temperature compensating.

I claim:

1. A drive assembly comprising an input member rotatable about a first axis, an output member rotatable about a second axis, a transmission member rotatable about a third axis which extends transverse to said first and second axes and cooperates with said input and output members to rotatably drive said output member in response to rotation of said input member, said transmission member being displaceable along said third axis to change the ratio at which drive is transmitted from said input member to said output member, fluid pressure operated means for controlling said displacement of said transmission member, and valve means for controlling fluid flow to said fluid pressure operated means, said valve means being adjustable in response to variation in speed of said output member to maintain the speed of rotation of said output member substantially constant when said speed attains a predetermined value.

2. a drive assembly as claimed in claim 1 in which the first and second axes are in substantially parallel and spaced planes, said input and output members each having a drive face which drive faces extend laterally with respect to the longitudinal extent of the first and second axes and the transmission member co-operates with both said drive faces to be rotatable about the third axis in transmitting drive from the input member to the output member.

3. A drive assembly as claimed in claim 1 in which the valve means comprises a spool valve, displacement of the spool in which is controlled in response to variations in the speed of rotation of the output member to determine the fluid pressure which is directed to the fluid pressure operated means.

4. A drive assembly as claimed in claim 1, in which the transmission member is biased in the direction of the third axis to a position which it adopts when the output member is non-rotating and in which position the mechanical advantage of the drive which will be transmitted from the input member to the output member is at a maximum and thereby the speed of rotation of the output member will be at a minimum for a given speed of rotation of the input member.

5. A drive assembly as claimed in claim 1 in which at least one of the input and output members includes a torque sensitive device which device, when that member is rotatably driven, reacts to displace that member in the direction of its axis of rotation to bias that member into driving engagement with the transmission member.

6. A drive assembly as claimed in claim 1 in which the valve means is adjusted in response to displacement of a centrifugally actuated governor which governor is responsive to the speed of rotation of the output member.

7. A drive assembly as claimed in claim 6 in which the centrifugal governor is carried by the output member for rotation therewith and comprises captured ball members which are centrifugally displaceable radially relative to the second axis to adjust a displaceable part of the governor substantially in the direction of the second axis, such adjustment of said displaceable part causing said adjustment of the valve means.

8. A drive assembly as claimed in claim 1 in which the input member is a first disc rotatable with an input shaft, the output member is a second disc rotatable with an output shaft and the transmission member is a roller.

9. A drive assembly as claimed in claim 8 wherein a torque sensitive device is incorporated between one of said first and second discs and a respective shaft with which said one of said first and second discs is rotatable, said one of said first and second discs being axially displaceable with respect to its shaft so that when said respective shaft is rotated said torque sensitive device reacts to displace said one of said first and second discs axially relative to its shaft and into driving engagement with said transmission member.

10. A drive assembly as claimed in claim 9 in which the torque sensitive device comprises a pin co-operating with an axially inclined slot which couples together the disc and shaft and determines restricted axial and rotational displacement of the disc relative to its shaft.

11. A drive assembly as claimed in claim 1 in which the fluid pressure operated means comprises a piston and cylinder device.

12. A drive assembly as claimed in claim 11 in which the transmission member is coupled to a piston rod of the piston and cylinder device for displacement therewith along the third axis.

13. A drive assembly as claimed in claim 4 in which the piston and cylinder device is double acting.

14. A drive assembly as claimed in claim 11 wherein said piston and cylinder device is single acting, and said piston is biased in the direction to contract the cylinder fluid pressurized chamber.

15. A drive assembly as claimed in claim 14 wherein said valve means is adjusted to a position at which said valve means communicates said cylinder fluid pressurized chamber with a reservoir when said output member does not rotate.

* * * * *

UNITED STATES PATENT AND TRADEMARK OFFICE
CERTIFICATE OF CORRECTION

PATENT NO. : 4,305,306
DATED : December 15, 1981
INVENTOR(S) : Frederick J. Adams It is certified that error appears in the above-identified patent and that said Letters Patent are hereby corrected as shown below:

Column 9, line 6, delete "in which".

Column 8, line 63, change "a" to --A--.

Signed and Sealed this

Twenty-ninth Day of June 1982

[SEAL]

Attest:

GERALD J. MOSSINGHOFF

*Attesting Officer*   *Commissioner of Patents and Trademarks*